(12) United States Patent
Jang et al.

(10) Patent No.: US 8,887,225 B2
(45) Date of Patent: Nov. 11, 2014

(54) METHOD AND APPARATUS FOR REPRODUCING BROADCAST CONTENT, AND METHOD AND APPARATUS FOR PROVIDING BROADCAST CONTENT

(75) Inventors: Young-ick Jang, Seoul (KR); Hee-soo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1499 days.

(21) Appl. No.: 12/049,716

(22) Filed: Mar. 17, 2008

(65) Prior Publication Data
US 2009/0080865 A1 Mar. 26, 2009

(30) Foreign Application Priority Data
Sep. 21, 2007 (KR) .................. 10-2007-0096942

(51) Int. Cl.
| H04N 7/173 | (2011.01) |
| H04N 21/222 | (2011.01) |
| H04N 21/433 | (2011.01) |
| H04N 21/658 | (2011.01) |
| H04N 21/6377 | (2011.01) |
| H04N 21/6375 | (2011.01) |

(52) U.S. Cl.
CPC ......... *H04N 21/6377* (2013.01); *H04N 21/222* (2013.01); *H04N 21/4333* (2013.01); *H04N 21/658* (2013.01); *H04N 21/6375* (2013.01)
USPC ........... 725/115; 725/114; 714/746; 714/748; 714/776

(58) Field of Classification Search
USPC ................... 714/748, 776, 746; 725/114–115
See application file for complete search history.

(56) References Cited

U.S. PATENT DOCUMENTS

| 5,265,103 | A | * | 11/1993 | Brightwell | 714/748 |
| 6,757,332 | B1 | * | 6/2004 | Kadono | 375/240.25 |
| 7,039,837 | B2 | * | 5/2006 | Martini et al. | 714/52 |
| 7,617,516 | B2 | * | 11/2009 | Huslak et al. | 725/95 |
| 7,986,633 | B2 | | 7/2011 | Ryu et al. | |
| 2003/0023915 | A1 | | 1/2003 | Choi | |
| 2003/0051254 | A1 | * | 3/2003 | Weidenfeller | 725/118 |
| 2003/0126238 | A1 | * | 7/2003 | Kohno et al. | 709/220 |
| 2005/0232154 | A1 | * | 10/2005 | Bang et al. | 370/235 |

(Continued)

FOREIGN PATENT DOCUMENTS

| JP | 2005-020193 A | 1/2005 |
| KR | 20040023568 A | 3/2004 |

(Continued)

OTHER PUBLICATIONS

Communication dated Sep. 5, 2013, issued by the Korean Intellectual Property Office in corresponding Application No. 10-2007-0096942.

*Primary Examiner* — Mulugeta Mengesha
(74) *Attorney, Agent, or Firm* — Sughrue Mion, PLLC

(57) ABSTRACT

Provided are a method and apparatus for reproducing broadcast content in a digital television (DTV) in real time, and a method and apparatus for providing broadcast content to a DTV. In the reproducing method, reproduction of broadcast content is controlled to be temporarily stopped if an error is present in received packets constituting the content; packets received after the temporary stopping of the reproduction are stored; a errorless packet, which corresponds to a packet having the error, is obtained; and the content is reproduced using the obtained packet and the stored packets.

18 Claims, 9 Drawing Sheets

(56) References Cited

U.S. PATENT DOCUMENTS

2006/0236153 A1* 10/2006 Aaltonen .................. 714/25
2007/0209057 A1* 9/2007 Musson et al. ............ 725/111
2007/0217519 A1* 9/2007 Murayama et al. ...... 375/240.25

FOREIGN PATENT DOCUMENTS

| KR | 20040024628 A | 3/2004 |
| KR | 10-2006-0066636 A | 6/2006 |
| KR | 20060098157 A | 9/2006 |

* cited by examiner

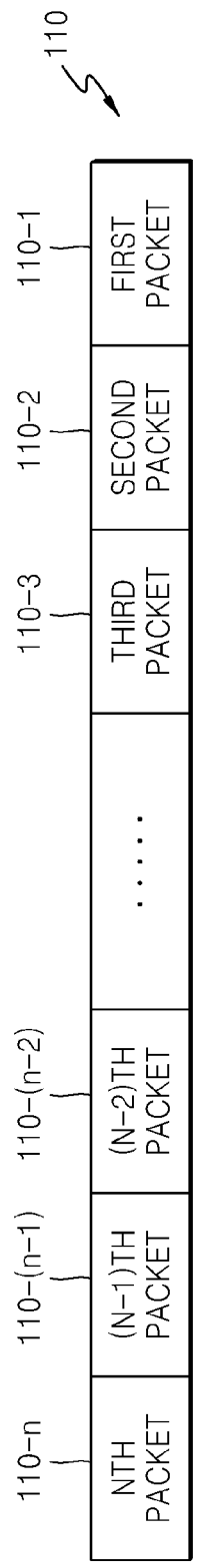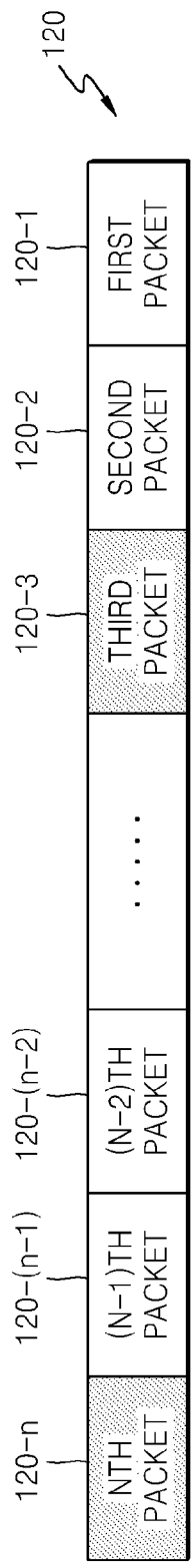
FIG. 1A (RELATED ART)
FIG. 1B (RELATED ART)

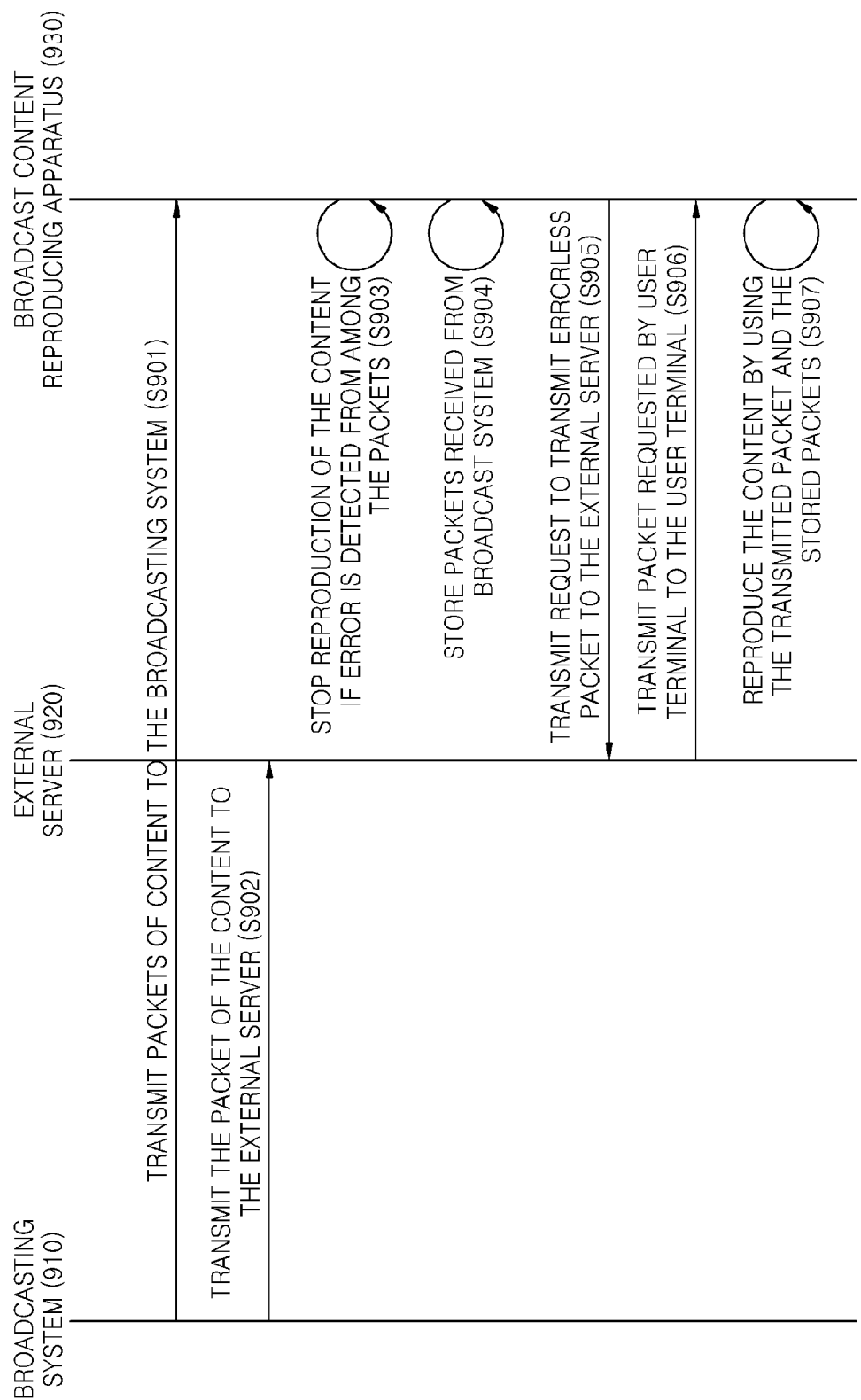

METHOD AND APPARATUS FOR REPRODUCING BROADCAST CONTENT, AND METHOD AND APPARATUS FOR PROVIDING BROADCAST CONTENT

CROSS-REFERENCE TO RELATED PATENT APPLICATIONS

This application claims priority from Korean Patent Application No. 10-2007-0096942, filed on Sep. 21, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to reproducing and providing broadcast content, and more particularly, to reproducing broadcast content in a digital television (DTV) and providing broadcast content to a DTV.

2. Description of the Related Art

A DTV receiver receives a data stream in the form of packets from a broadcasting system that provides a broadcast service, and reproduces broadcast content by using the data stream. However, noise may be present in the data stream due to environmental conditions, such as communication conditions between the broadcasting system and the television receiver. Thus, a user located in a bad communication environment, such as a tunnel, receives a data stream containing much noise, and the quality of broadcast content reproduced deteriorates accordingly, in proportion to the amount of noise. In particular, when the television receiver receives a data stream containing much noise and reproduces broadcast content by using the data stream, reproduction of an image may be interrupted or an image or sound reproduced may be deformed.

FIG. 1A illustrates a related art data stream 110 transmitted from a broadcasting system. It is assumed that the data stream 110 consists of N packets. Initially, noise does not exist in the data stream 110.

FIG. 1B illustrates another related art data stream 120 transmitted to a user terminal. Noise is added to the data stream 120 while the data stream 120 is being received from a broadcasting system, and the noise may cause a fatal error to occur in some packets, e.g., packets 120-3 and 120-n, from among the packets of the data stream 120. In order to enable the user terminal to reproduce content, data must be extracted from the received packets. However, it may not be possible to extract data from the packets 120-3 and 120-n containing the fatal error, or data extracted therefrom may be deformed. This problem causes reproduction of the content to be interrupted or an image or sound reproduced by the user terminal to be degraded.

In the case of a related art user terminal, when an image is degraded or cannot be viewed due to an error in received packets, it is difficult to solve such a problem. In particular, even if a receiving environment is improved, a user cannot view again an image that has been deformed or interrupted before the improvement. Thus, a part of the image that cannot be viewed due to the error can never be viewed using the related art user terminal.

This problem becomes more serious in the case of a user terminal, such as a Digital Multimedia Broadcasting (DMB) receiver, which can receive a broadcast even while mobile. In the case of such a user terminal, a receiving environment frequently changes according to location, and thus broadcasting is often interrupted or an image reproduced is often deformed, thereby preventing a user from viewing the broadcast satisfactorily.

SUMMARY OF THE INVENTION

The present invention provides a method and apparatus for seamlessly reproducing broadcast content without distorting the broadcast content, and a method and apparatus for providing broadcast content so that the broadcast content can be seamlessly reproduced in a user terminal without being distorted.

According to an aspect of the present invention, there is provided a method of reproducing broadcast content in real time by using a television receiver, the method comprising if an error is present in one of packets constituting the broadcast content, controlling reproduction of the content to be temporarily stopped; storing packets received after the temporary stopping of the reproduction; obtaining an errorless packet, which corresponds to the packet having the error; and reproducing the content by using the obtained packet and the stored packets.

The obtaining of the corresponding errorless packet may include requesting a server, which stores the packets constituting the broadcast content, to transmit the corresponding errorless packet; and obtaining the corresponding errorless packet via an external communication network.

The obtaining of the corresponding errorless packet may include receiving the packets constituting the broadcast content again after a predetermined period of time; and obtaining the corresponding errorless packet from among the packets being received again after the predetermined period of time.

The packet having the error may be detected based on header information of the packets.

The reproducing of the content may include replacing a packet having an error from among the stored packets with the obtained packet; and reproducing the broadcast content by using the stored packets including the replaced packet.

According to another aspect of the present invention, there is provided a method of providing broadcast content to a user terminal, the method comprising receiving packets transmitted to the user terminal from a broadcasting system which provides broadcast content in real time; and transmitting an errorless packet which corresponds to the packets having an error from among the packets transmitted to the user terminal from the broadcasting system, to the user terminal via an external communication network.

According to another aspect of the present invention, there is provided an apparatus for reproducing broadcast content in real time, the apparatus comprising a controlling unit controlling reproduction of the content to be temporarily stopped if an error is present in one of packets constituting the broadcast content; a database storing packets received after the temporary stopping of the reproduction; a packet obtaining unit obtaining an errorless packet, which corresponds to the packet having the error; and a reproducing unit reproducing the content by using the obtained packet and the stored packets.

According to another aspect of the present invention, there is provided an apparatus for providing broadcast content to a user terminal, the apparatus comprising a receiving unit receiving packets transmitted to the user terminal from a broadcasting system which provides broadcast content in real time; and a transmitting unit transmitting an errorless packet which corresponds to the packets having an error from among the packets transmitted to the user terminal from the broadcasting system, to the user terminal via an external communication network.

As described above, it is possible to view high-quality broadcast content by receiving an errorless packet, which corresponds to an error packet.

If an error is present in a packet of broadcast content, the error packet is first stored, a packet corresponding to the error packet is received, and then content is reproduced using stored packets together with the corresponding packet, thereby allowing a user to view the broadcast content without interruption even in a bad receiving environment.

BRIEF DESCRIPTION OF THE DRAWINGS

The above and other aspects of the present invention will become more apparent by describing in detail exemplary embodiments thereof with reference to the attached drawings in which:

FIG. 1A illustrates a related art data stream transmitted from a broadcasting system;

FIG. 1B illustrates another related art data stream transmitted to a user terminal;

FIG. 9 is a flowchart illustrating a method of providing and reproducing broadcast content according to another exemplary embodiment of the present invention.

DETAILED DESCRIPTION OF EXEMPLARY EMBODIMENTS OF THE INVENTION

Exemplary embodiments of the present invention will now be described in detail with reference to the accompanying drawings.

Figure 2:
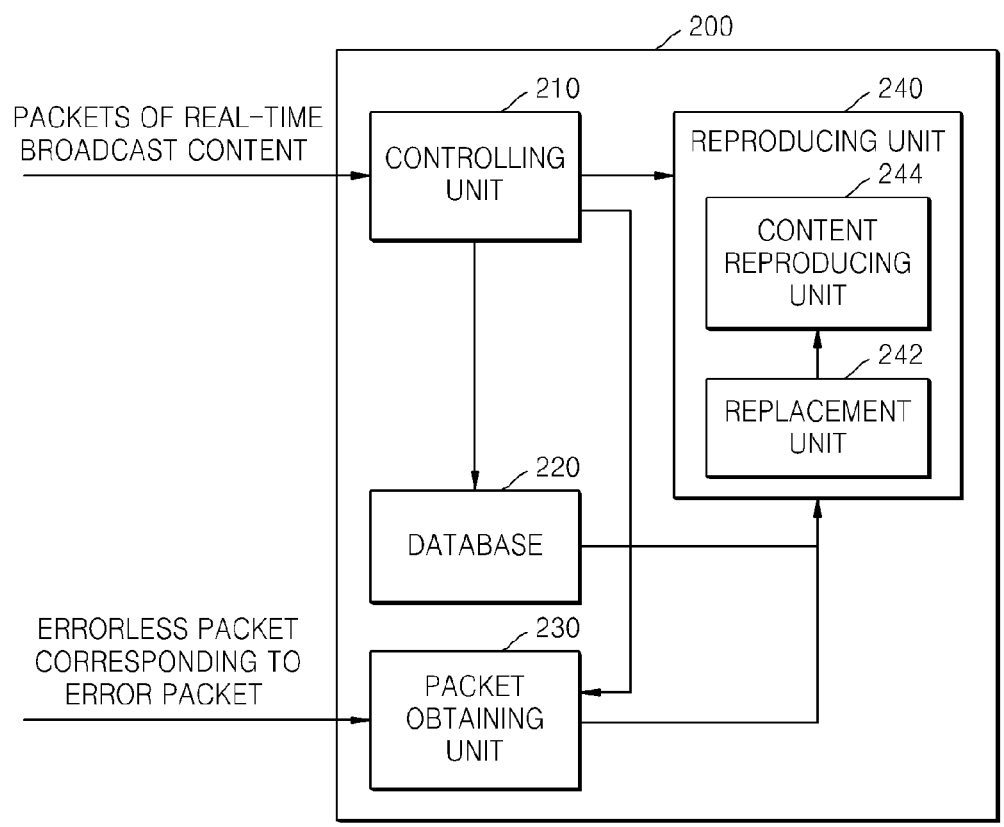
FIG. 2 is a block diagram of a broadcast content providing apparatus according to an exemplary embodiment of the present invention.

FIG. 2 is a block diagram of a broadcast content reproducing apparatus 200 according to an exemplary embodiment of the present invention. The reproducing apparatus 200 includes a controlling unit 210, a database 220, a packet obtaining unit 230, and a reproducing unit 240.

If an error is detected from among packets constituting broadcast content, the controlling unit 210 controls reproduction of the content to be temporarily discontinued. The reproducing apparatus 200 may further include a determination unit (not shown) for determining whether an error is detected from the packets of the broadcast content. In this case, if an error is detected from among the packets based on determination of the determination unit, the controlling unit 210 controls the reproducing unit 240 to temporarily discontinue reproduction of the content.

Alternatively, the controlling unit 210 may determine whether an error is detected from among the packets of the broadcast content. In this case, the controlling unit 210 directly determines whether an error is detected from among the packets and then controls the reproducing unit 240.

Whether an error is detected from among the packets of the broadcast content may be determined based on header information of the packets. For example, whether an error is present in the packets may be determined based on a program clock reference (PCR), a packet identification (PID), and a continuity counter that are contained in the header information.

The reproducing apparatus 200 may further include a receiving unit (not shown). The receiving unit receives the packets constituting the broadcast content from a broadcasting system, and then delivers the packets either to the database 220 in order to store the packets or to the reproducing unit 240 in order to reproduce the broadcast content by using the packets.

For example, if an error is present in a third packet from among the packets of the broadcast content, the receiving unit may transmit a first packet and a second packet to the reproducing unit 240 so that the broadcast content can be reproduced in real time. Also, the receiving unit may provide the database 220 with the remaining packets following the third packet so as to store them.

Packets being received after data reproduction is discontinued are stored in the database 220. For example, if an error is present in the third packet of the packets of the broadcast content, a fourth packet and all the other remaining packets thereafter are stored in the database 220.

The packet obtaining unit 230 obtains an errorless packet, which corresponds to the error packet. The packet obtaining unit 230 may obtain the packets by using various methods.

For example, the packet obtaining unit 230 can receive a packet corresponding to the error packet from an external server storing the packets of the content that is currently being reproduced in the user terminal. The reproducing apparatus 200 capable of obtaining packets from an external server according to an exemplary embodiment of the present invention will later be described in detail with reference to FIG. 3.

Also, the packet obtaining unit 230 includes a tuner (not shown) that is different from a tuner included in the receiving unit, and can obtain a packet corresponding to the error packet after a predetermined period of time from among the packets that are received again from the broadcasting system. In this case, the packet obtaining unit 230 may also include a packet extraction unit (not shown).

When the packet obtaining unit 230 obtains packets from the broadcasting system, the tuner uses a frequency that is different than a frequency that the receiving unit uses. Thus, the broadcasting system must have a first channel for transmitting packets to the receiving unit, and a second channel for transmitting the packets to the tuner included in the packet obtaining unit 230.

The broadcasting system transmits the packets via the first channel, and then transmits the same packets to the tuner in the packet obtaining unit 230 via the second channel after a predetermined period of time. For example, the packets constituting the broadcast content may be transmitted to the tuner in the packet obtaining unit 230 ten minutes after the same packets are transmitted to the receiving unit. In this case, the broadcasting system transmits the packets via the first channel, and transmits the same packets via the second channel ten minutes after the transmission via the first channel.

The packet extraction unit extracts an errorless packet corresponding to the error packet from among the packets transmitted to the tuner after the predetermined period of time. That is, only a desired packet is extracted from among the packets transmitted to the tuner and the extracted packet is used. The broadcast content reproducing apparatus 200 capable of obtaining packets from a broadcasting system according to an exemplary embodiment of the present invention will be described in detail later with reference to FIG. 5.

The reproducing unit 240 reproduces the broadcast content by using the received packets, which are received via the receiving unit, in real time before an error occurs in the received packets. However, if an error occurs in the received packets, the reproducing unit 240 temporarily stops reproduction of the broadcast content. Then, if the packet obtaining unit 230 obtains a packet corresponding to a packet containing the error, the reproducing unit 240 reproduces the broadcast content by using the obtained packet and the packets stored in the database 220.

The reproducing unit 240 may include a replacement unit 242 and a content reproducing unit 244.

The replacement unit 242 replaces a packet containing an error from among the packets stored in the database 220 with a packet obtained by the packet obtaining unit 230. For example, if N packets are stored in the database 220 and an error is present in a first packet and a tenth packet from among the N packets, the first and tenth packets are replaced with packets obtained by the packet obtaining unit 230.

The content reproducing unit 244 reproduces the broadcast content by using the packets stored in the database 220 in which the packet containing the error has been replaced with the packet obtained by the packet obtaining unit 230. Since all the error packets are replaced with the packets obtained by the packet obtaining unit 230, the quality of the broadcast content reproduced can be improved.

Figure 3:
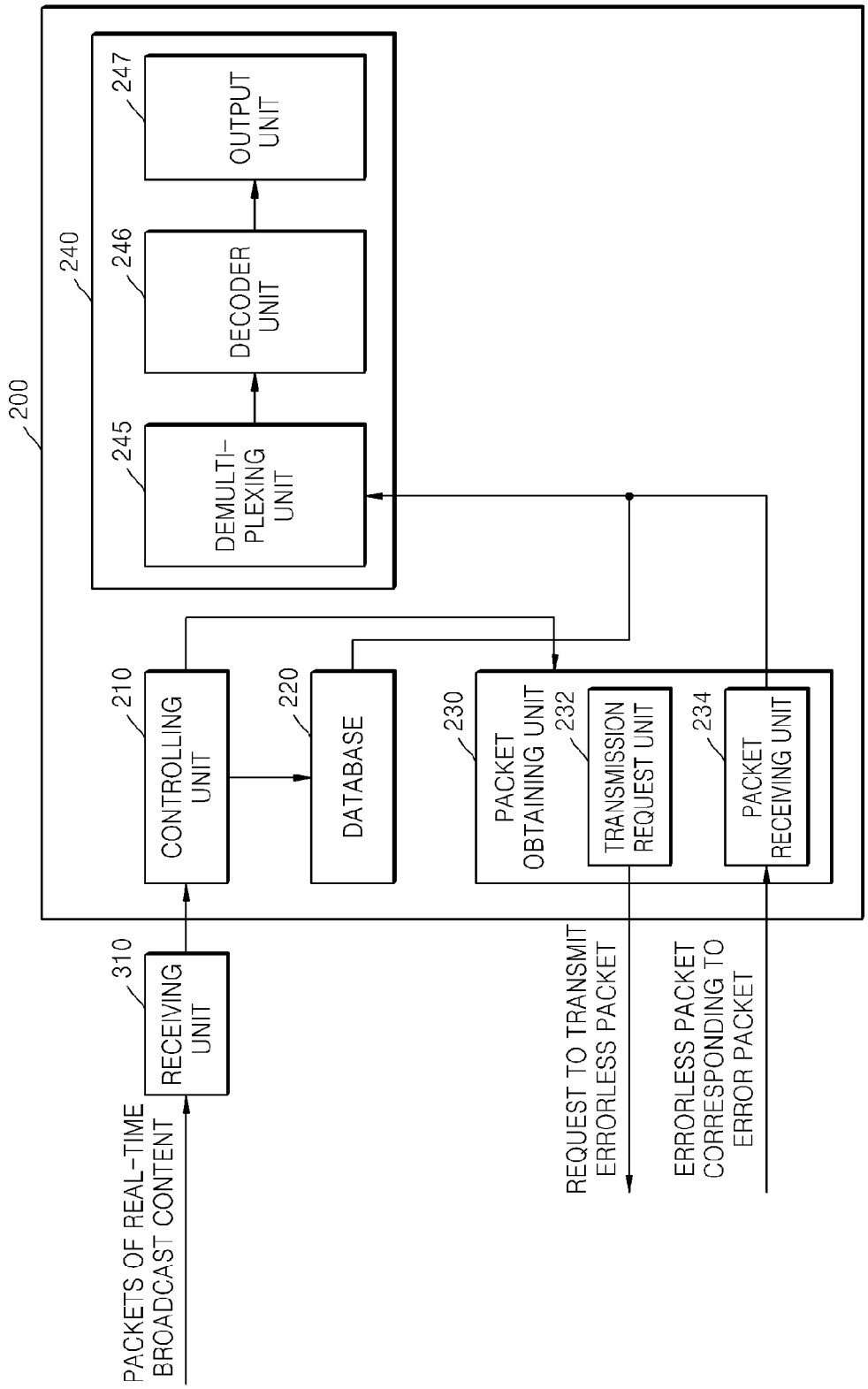
FIG. 3 is a block diagram of a broadcast content reproducing apparatus using an external server according to an exemplary embodiment of the present invention.

FIG. 3 is a block diagram of a broadcast content reproducing apparatus 200 using an external server according to an exemplary embodiment of the present invention.

A receiving unit 310 receives packets constituting broadcast content that is to be reproduced by the reproducing apparatus 200 from a broadcasting system.

If an error is detected among the packets received via the receiving unit 310, the controlling unit 210 temporarily stops reproduction of the content. The controlling unit 210 can either determine whether an error is present in each of the packets received via the receiving unit 310, or determine whether an error is present for every predetermined number of the packets. If an error is detected from among the received packets, the controlling unit 210 controls the reproducing unit 240 to temporarily stop reproduction of the content, and packets received via the receiving unit 310 after the stopping of the reproduction to be stored in a database 220. At the same time, the controlling unit 210 controls a packet obtaining unit 230 to obtain a packet corresponding to the packet containing the error from an external server.

The packet obtaining unit 230 obtains the packet corresponding to the error packet containing the error from the external server. The packet obtaining unit 230 may include a transmission request unit 232 and a packet receiving unit 234.

The transmission request unit 232 requests the external server that stores the packets of the content to transmit the errorless packet corresponding to the error packet. That is, the transmission request unit 232 requests the external server to transmit the packet corresponding to the error packet detected by the controlling unit 210. The transmission request unit 232 can request the desired packet by defining the desired packet by transmitting transmit header information of the error packet to the external server. In this case, the external server storing the packets of the content may be a server managed by a broadcasting station or a third content provider that is not related to the broadcasting station.

The packet receiving unit 234 receives the corresponding errorless packet in response to the request from the transmission request unit 232, via an external communication network. The packet receiving unit 234 can easily obtain a desired packet via the external communication network regardless of a broadcast receiving environment. There are various examples of the external communication network that the packet receiving unit 234 can use, e.g., Wireless Broadband (WiBro), High-Speed Downlink Packet Access (HSDP), a wireless local area network (LAN), and Wideband Code Division Multiple Access (WCDMA).

The reproducing unit 240 reproduces the content by using the packet obtained by the packet obtaining unit 230 and the packets stored in the database 220. The reproducing unit 240 may include a demultiplexing unit 245, a decoder unit 246 and an output unit 247. The demultiplexing unit 245 demultiplexes the packets and transmits the demultiplexed result to the decoder unit 246. Although not shown, the decoder unit 246 may include an audio decoder and a video decoder. The audio decoder receives and decodes audio packets, and the video decoder receives and decodes video packets.

The output unit 247 outputs the content by using the decoded data. Although not shown, the output unit 247 may output the content to a monitor and a speaker. The monitor outputs video data and the speaker outputs audio data.

Figure 4:
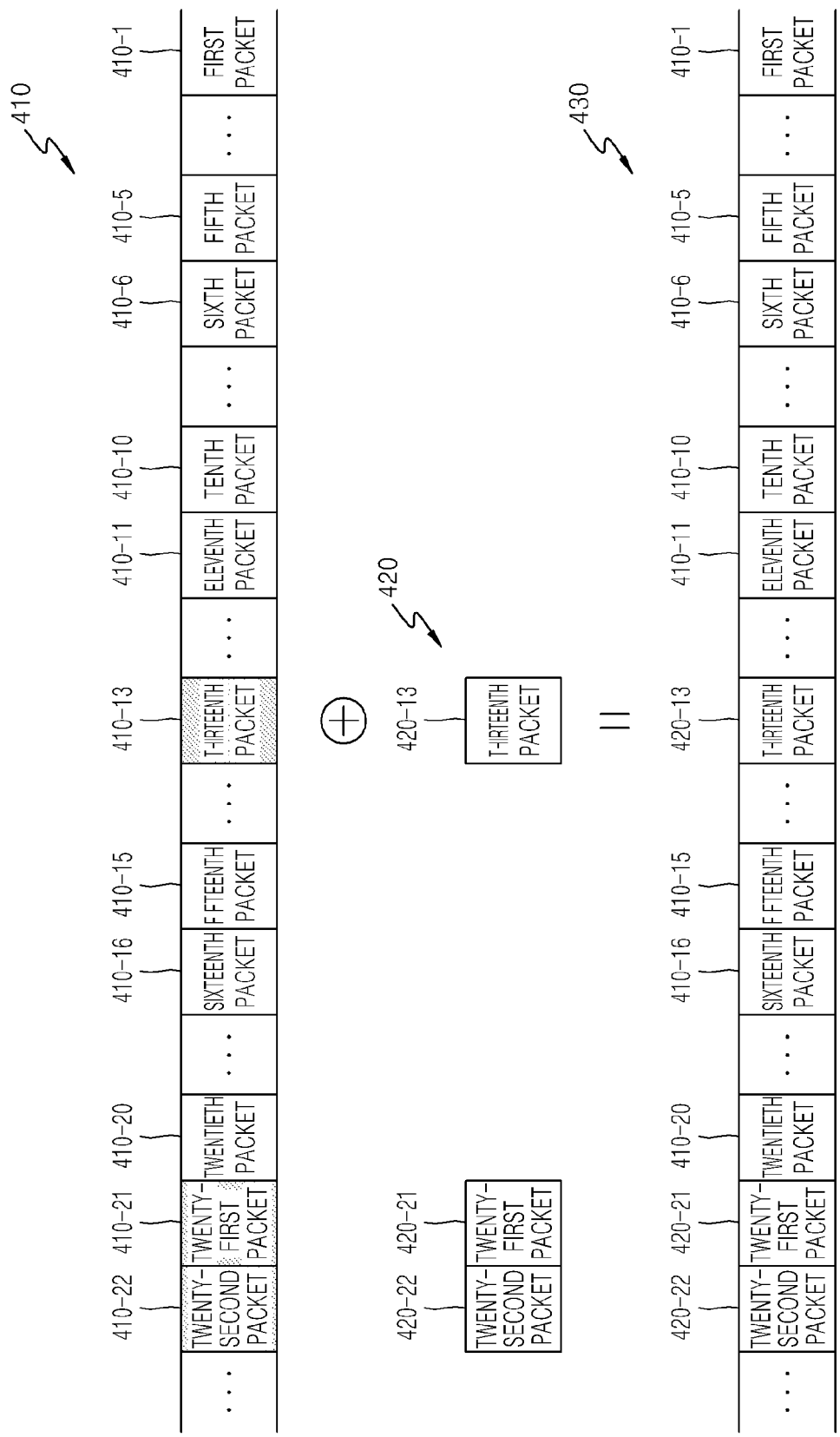
FIG. 4 is a diagram illustrating processing of a packet by using the broadcast content reproducing apparatus illustrated in FIG. 3, according to an exemplary embodiment of the present invention.

FIG. 4 is a diagram illustrating processing of a packet by using the broadcast content reproducing apparatus 200 illustrated in FIG. 3 that receives a packet corresponding to an error packet from an external server, according to an exemplary embodiment of the present invention.

The receiving unit 310 receives packets 410 of content that is to be reproduced by the reproducing apparatus 200 from a broadcasting system in real time. An error is present in a thirteenth packet 410-13, a twenty-first packet 410-21, and a twenty-second packet 410-22 from among the packets 410.

If an error is present in the received packets 410, the controlling unit 210 controls reproduction of the content to be temporarily stopped. It is assumed that whether the received packets 410 contains an error is determined by the controlling unit 210 and the controlling unit 210 determines whether an error is present for every five packets of the received packets. In the current exemplary embodiment, the controlling unit 210 determines whether an error is present for every five packets of the received packets but may determine whether an error is present for each of the received packets.

The controlling unit 210 determines whether an error is present in a first packet 410-1 to a fifth packet 410-5. If the controlling unit 210 determines that an error is not present in the first packet 410-1 to the fifth packet 410-5, the reproducing unit 240 reproduces the content based on the first packet 410-1 to the fifth packet 410-5.

The controlling unit 210 then determines whether an error is present in a sixth packet 410-6 to a tenth packet 410-10. If the controlling unit 210 determines that an error is not present in the sixth packet 410-6 to the tenth packet 410-10, the reproducing unit 240 reproduces the content based on the sixth packet 410-6 to the tenth packet 410-10.

Next, the controlling unit 210 determines whether an error is present in an eleventh packet 410-11 to a fifteenth packet 410-15. If the controlling unit 210 determines that the thirteenth packet 410-13 contains an error, the controlling unit 210 controls the reproducing unit 240 to temporarily stop reproduction of the content. At the same time, the remaining packets 410-11 through 410-22 received after receiving of the eleventh packet 410-11 are stored in the database 220.

The packet obtaining unit 230 obtains a thirteenth errorless packet 420-13, which corresponds to the thirteenth packet 410-13, from the external server.

If the packet obtaining unit 230 obtains the thirteenth packet 420-13 having no error, the reproducing unit 240 reproduces the content by using the packets stored in the database 220 and the thirteenth packet 420-13 obtained by the packet obtaining unit 230.

The receiving unit 310 continuously receives subsequent packets and stores them in the database 220 in real time while the packet obtaining unit 230 obtains the thirteenth packet 420-13 via the external communication network. The controlling unit 210 also continuously detects a packet containing an error by checking every five packets of the packets received via the receiving unit 310 while the packet obtaining unit 230 obtains the thirteenth packet 420-13 via the external communication network.

The controlling unit 210 determines whether an error is present in the twenty-first packet 410-21 to a twenty-fifth packet 410-25. If the controlling unit 210 determines that the twenty-first packet 410-21 and the twenty-second packet 410-22 contain an error, the packet obtaining unit 230 must obtain a twenty-first packet 420-21 and a twenty-second packet 420-22 having no error, which respectively correspond to the twenty-first packet 410-21 and the twenty-second packet 410-22.

However, since the reproducing unit 240 temporarily stops reproduction of the content while the packet obtaining unit 230 obtains the thirteenth packet 420-13, a time difference occurs between a packet received via the receiving unit 310 in real time and a packet reproduced by the reproducing unit 240. This means that the reproducing unit 240 can seamlessly reproduce the content using the packets stored in the database 220 even while the packet obtaining unit 230 obtains the twenty-first packet 410-21 and the twenty-second packet 410-22. Thus, even if an error is detected in the twenty-first packet 410-21, the controlling unit 210 does not need to control the reproducing unit 240 to stop reproduction of the content. Accordingly, the content is continuously reproduced.

For example, if it takes five seconds for the packet obtaining unit 230 to obtain the thirteenth packet 420-13, the reproducing unit 240 temporarily stops reproduction of the content for five seconds. However, even for the five seconds, the receiving unit 310 continuously receives packets in real time, and the controlling unit 210 determines whether an error is present in the received packets. It is assumed that the twentieth packet 410-20 is received via the receiving unit 310 at the instant of time when the packet obtaining unit 230 obtains the thirteenth packet 420-13.

The eleventh packet 410-11 to the twentieth packet 410-20 are stored in the database 220 at the instant of time when the packet obtaining unit 230 obtains the thirteenth packet 420-13. While the reproducing unit 240 reproduces the content by using the packets stored in the database 220 and the thirteenth packet 420-13 obtained by the packet obtaining unit 230, the receiving unit 310 receives the twenty-first packet 410-21 to the twenty fifth packet 410-25. Accordingly, the controlling unit 210 determines that the twenty-first 410-21 and the twenty-second packet 410-22 contain an error. Thus, the packet obtaining unit 230 must obtain the twenty-first 420-21 and the twenty-second packet 420-22 from the external server. However, while the packet obtaining unit 230 obtains the twenty-first 410-21 and the twenty-second packet 410-22 from the external server, the reproducing unit 240 continuously reproduces the content by using the packets stored in the database 220 and the thirteenth packet 420-13 obtained by the packet obtaining unit 230.

However, there is a case where the packet obtaining unit 230 cannot obtain the twenty-first packet 420-21 and the twenty-second packet 420-22 without errors even if the reproducing unit 240 reproduces the content by processing the eleventh packet 410-11 to the twentieth packet 410-20 stored in the database 220 and the thirteenth packet 420-13 obtained by the packet obtaining unit 230. In this case, the controlling unit 210 may control the reproducing unit 240 to stop reproduction of the content until the packet obtaining unit 230 obtains the twenty-first packet 420-21 and the twenty-second packet 420-22.

In the current exemplary embodiment, broadcast content is reproduced in real time until an error is first detected from among packets being received starting from an instant of time when a user turns on the reproducing apparatus 200. Thus, if a packet containing an error is first detected, reproduction of the content is temporarily stopped until an errorless packet corresponding to the error packet is received. In order to reduce an interval of time during which reproduction of the content is stopped, the reproducing apparatus 200 may set an external server and a transmission channel the moment packets are received. Various methods may be used in order to set an external server and a transmission channel. For example, a transmission channel may be set in such a manner that packets constituting desired content can be quickly transmitted to the reproducing apparatus 200 if the reproducing apparatus 200 requests the external server to authenticate a user and the request is accepted.

However, when a user turns on the reproducing apparatus 200, it is possible to receive packets from a broadcasting system in real time and then stand by without reproducing content until a predetermined amount of packets are stored in the database 220. For example, it is assumed that the reproducing unit 240 starts reproduction of the content when the first packet 420-1 to the twentieth packet 420-20 are stored in the database 220. In this case, the reproducing unit 240 can continuously reproduce the content by using the packets stored in the database 220 even while the packet obtaining unit 230 obtains the errorless packet 420-21, which corresponds to the received twenty-first packet 410-21.

The reproducing unit 240 reproduces the content by using the errorless packets 430 as described above, thereby allowing a user to view the broadcast content seamlessly.

Figure 5:
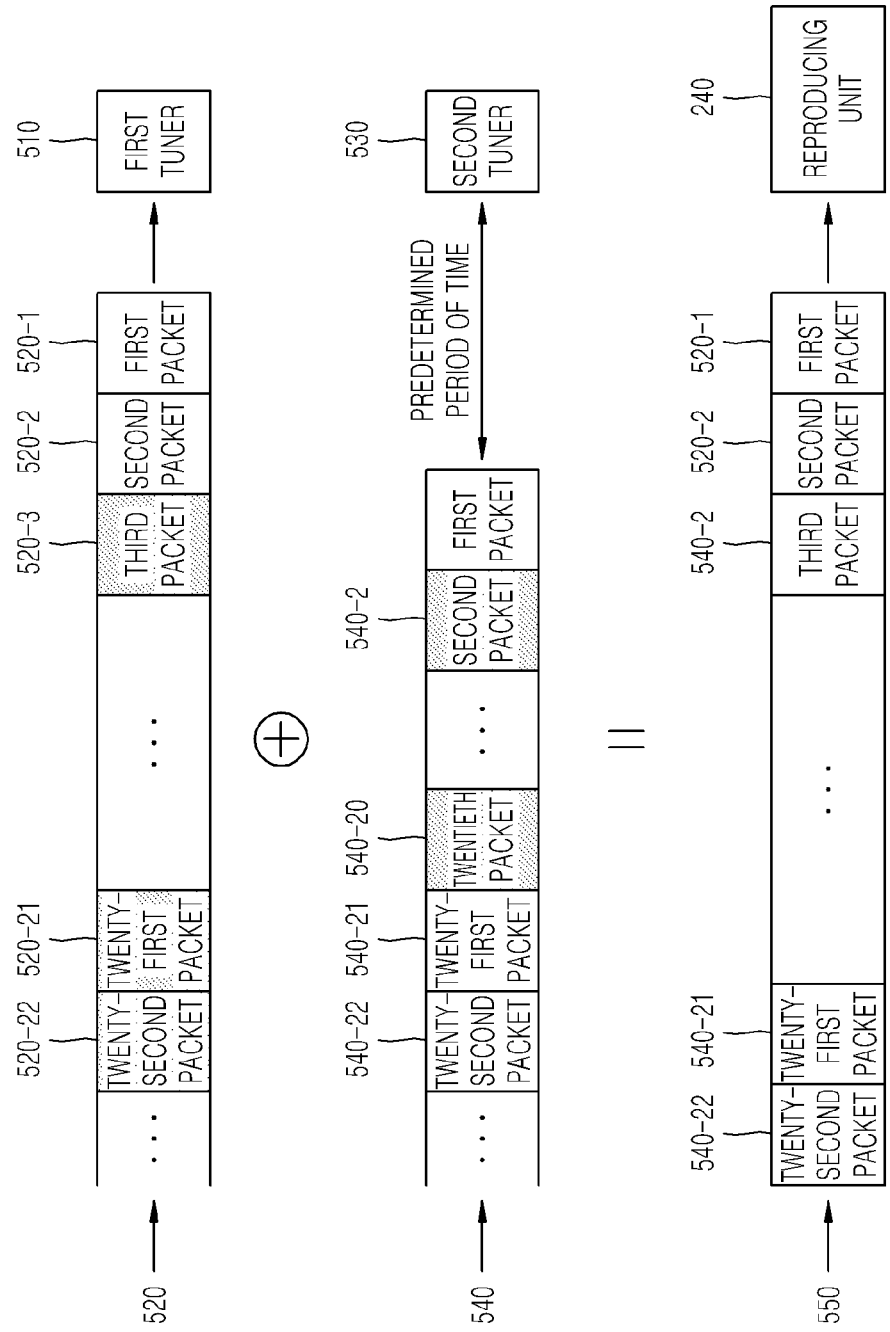
FIG. 5 is a diagram illustrating processing of packets by using the broadcast content reproducing apparatus illustrated in FIG. 2 that receives the packets again from a broadcasting system, according to another exemplary embodiment of the present invention.

FIG. 5 illustrates processing of packets by using the broadcast content reproducing apparatus 200 illustrated in FIG. 2 that receives packets again from a broadcasting system, according to another exemplary embodiment of the present invention.

A first tuner 510 receives packets 520 related to content that is to be reproduced, from the broadcasting system. A reproducing unit 240 processes the packets 520 received from the first tuner 510 in order to reproduce the content. A third packet 520-3, a twenty-first packet 520-21 and a twenty-second packet 520-22 from among the packets 520 received via the first tuner 510 contain an error.

The second tuner 530 receives packets 540 related to the same content from the broadcasting system a predetermined period of time after receiving the packets 520. For example, it is assumed that the second tuner 530 receives packets transmitted to the first tuner 510 again ten seconds after receiving the packets.

If the reproducing apparatus 200 is used while moving, e.g., if a user uses the reproducing apparatus 200 in a moving vehicle, a receiving environment ten seconds previously may be different to a receiving environment ten seconds later. Thus, a packet having an error from among the packets 520 received via the first tuner 510 may be different from a packet having an error from among the packets 540 received via the second tuner 530. A second packet 540-2 and a twentieth packet 540-20 from among the packets 540 received via the second tuner 530 contain an error.

The reproducing unit 240 reproduces the content by using the packets 520 received via the first tuner 510. If an error is detected from the packets 520 received via the first tuner 510, the controlling unit 210 temporarily stops reproduction of the content and then stores forthcoming packets. Thus, packets subsequent to the third packet 520-3 are stored in the database 220.

The packet obtaining unit 230 obtains the third packet 540-3 from among the packets 540 received via the second tuner 530 after ten seconds. If the second tuner 530 obtains the third packet 540-3, the reproducing unit 240 compares the third packet 540-3 received via the first tuner 510 with the third packet 540-3 received via the second tuner 530 in order to select better packets. After selecting better packets, the reproducing unit 240 reproduces the content by using the selected packets. When the packets are received again from the broadcasting system as illustrated in FIG. 5, even if the received packets contain only a small amount of error, the packets received via the first tuner 510 are compared with the packets received with the second tuner 520 in order to select better packets and then the content is reproduced using the selected packets, thereby improving the quality of the content reproduced. Thereafter, if an error is present in the packets, the packets are processed as described above with reference to FIG. 4.

Figure 6:
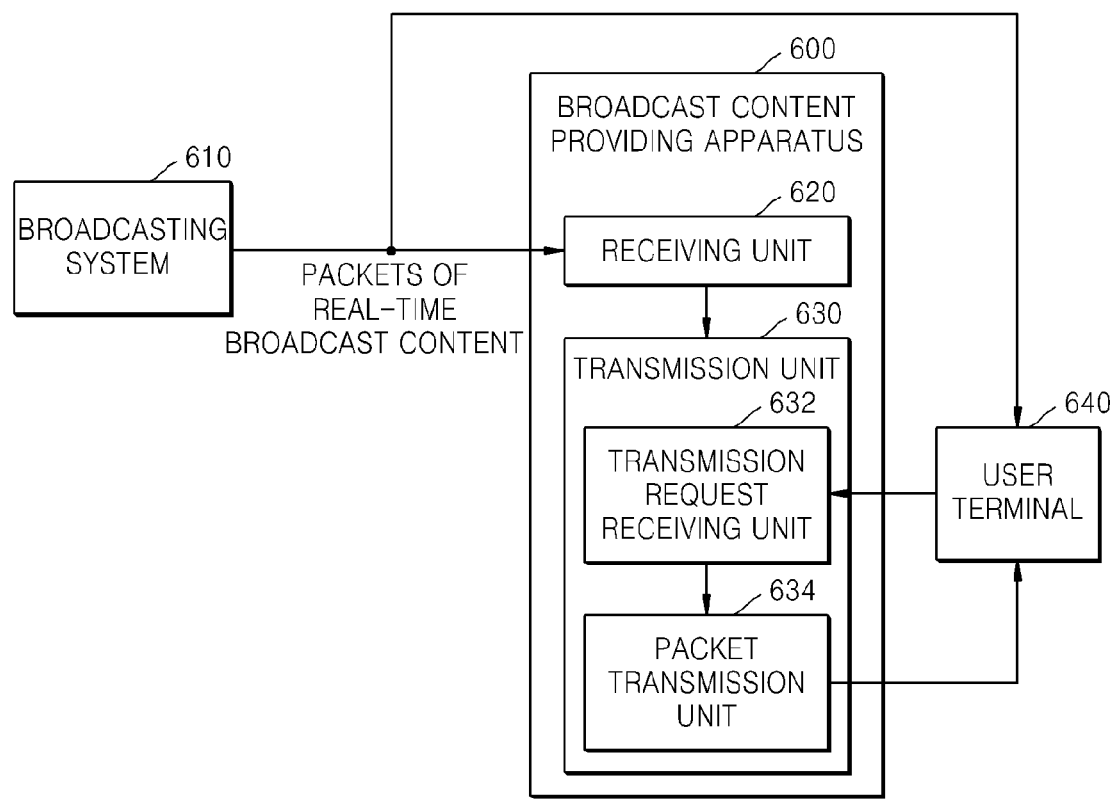
FIG. 6 is a block diagram of a broadcast content providing apparatus according to another exemplary embodiment of the present invention.

FIG. 6 is a block diagram of a broadcast content providing apparatus 600 according to another exemplary embodiment of the present invention. The apparatus 600 includes a receiving unit 620 and a transmitting unit 630.

The receiving unit 620 receives packets transmitted to a user terminal 640 from a broadcasting system 610 that provides broadcast content in real time. The receiving unit 620 may further include a database (not shown), and the packets received via the receiving unit 620 may be stored in the database.

The transmitting unit 630 transmits a errorless packet corresponding to the packet containing an error from among the packets, which were transmitted to the user terminal 640 from the broadcasting system 610, to the user terminal 640 via an external communication network (not shown). The transmitting unit 630 can the errorless packet to the user terminal 640 via the external communication network by obtaining information indicating whether the packets have been successfully transmitted to the user terminal 640. Also, the transmitting unit 630 may receive a request to transmit the errorless packet corresponding packet containing an error from among the packets, which were transmitted to the user terminal 640, from the user terminal 640 or the broadcasting system 610, and transmit the requested packet to the user terminal 640 via the external communication network. In this case, the transmitting unit 630 includes a transmission request receiving unit 632 and a packet transmitting unit 634.

The transmission request receiving unit 632 receives the request to transmit the errorless packet from the user terminal 640.

The packet transmitting unit 634 transmits a packet corresponding to the request from among broadcast packets received from the broadcasting system 610, to the user terminal 640.

Figure 7:
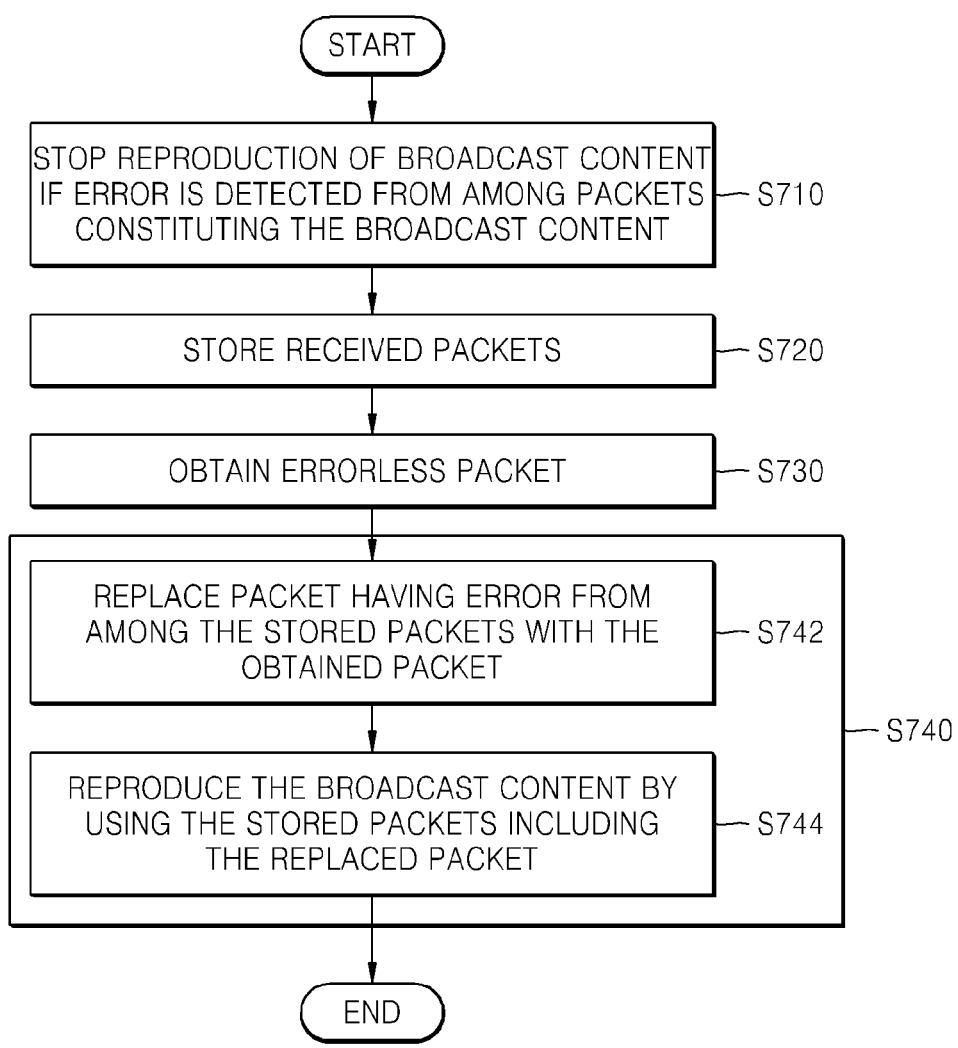
FIG. 7 is a flowchart illustrating a method of providing broadcast content according to an exemplary embodiment of the present invention.

FIG. 7 is a flowchart illustrating a method of providing broadcast content according to an exemplary embodiment of the present invention. In operation S710, if an error is detected from among packets constituting broadcast content, reproduction of the content is stopped.

In operation S720, packets being received after the stopping of the reproduction are stored.

In operation S730, an errorless packet, which corresponds to a packet having an error, is obtained.

Operation S730 may be performed by delivering a request to transmit the corresponding errorless packet to a server storing errorless packets related to the content, and receiving the corresponding errorless packet in response to the request via an external communication network.

Alternatively, operation S730 may be performed by receiving packets constituting broadcast content after a predetermined period of time, and then obtaining the corresponding errorless packet from among the received packets.

In operation S740, if the corresponding packet is obtained, the content is reproduced using the obtained packet and the stored packets.

Operation S740 may include operations S742 and S744.

In operation S742, the error packet from among the stored packets is replaced with the obtained packet.

In operation S744, the broadcast content is reproduced using the stored packets including the replaced packet.

Figure 8:
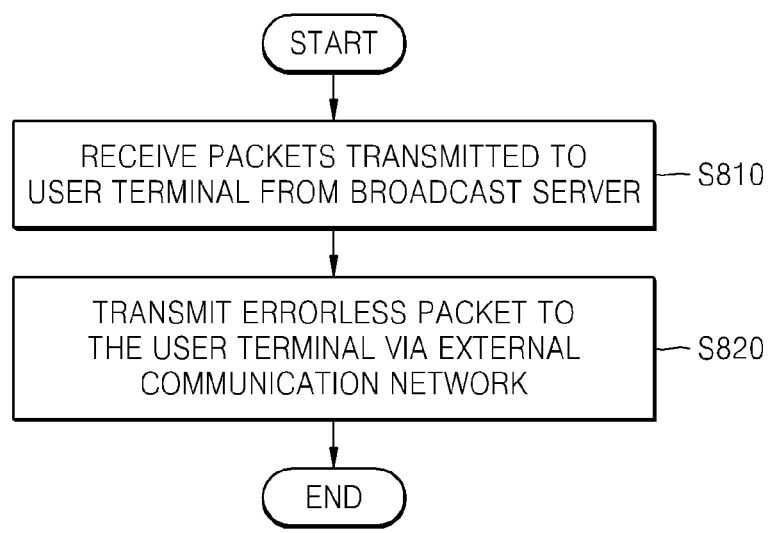
FIG. 8 is a flowchart illustrating a method of providing broadcast content according to another exemplary embodiment of the present invention.

FIG. 8 is a flowchart illustrating a method of providing broadcast content according to another exemplary embodiment of the present invention. In operation S810, broadcast packets are transmitted to a user terminal from a broadcasting system that provides broadcast content in real time.

In operation S820, errorless packet which corresponds to the packet having an error from among the packets transmitted to the user terminal from the broadcasting are transmitted to the user terminal via an external communication network.

Operation S820 may be performed by receiving a request to transmit the errorless packet from the user terminal, and transmitting a packet corresponding to the request from among broadcast packets received from the broadcasting system to the user terminal.

FIG. 9 is a flowchart illustrating a method of providing and reproducing broadcast content according to an exemplary embodiment of the present invention.

In operation S901, a broadcasting system 910 transmits packets related to content that is to be reproduced by a broadcast content reproducing apparatus 930. Packets identical to the packets transmitted to the broadcast content reproducing apparatus 930 are stored in an external server 920 by transmitting the identical packets to an external server 920 while simultaneously performing operation S901 (operation S902).

If an error is detected from among the packets received from the broadcasting system 910, the user terminal 930 temporarily stops reproduction of the content (operation S903). Then the user terminal 930 stores packets received from the broadcasting system 910 after the temporarily stopping of the reproduction (operation S904).

Next, the user terminal 930 transmits a request to transmit an errorless packet corresponding to a packet having an error to the external server 920 (operation S905).

Next, the external server 920 transmits the requested packet to the user terminal 930, based on the request from the user terminal 930 (operation S906).

Thereafter, the user terminal 930 reproduces the content by using the packet received from the external server 920 and the stored packets (operation S907).

In this disclosure, the user terminal means a digital TV and a broadcast signal is transmitted to the user terminal in the form of packets but the present invention is not limited thereto. The present invention can be applied to a case where a broadcast signal is an analog signal. For example, whether an error is present in an analog signal transmitted to the user terminal may be determined in predetermined units, and an analog signal corresponding to a unit having an error may be received again.

The above exemplary embodiments of the present invention can be embodied as a program that can be executed in a computer, and realized in a general digital computer that can execute the program, via a computer readable medium.

Examples of the computer readable medium include a magnetic storage medium (a ROM, a floppy disk, a hard disc, etc.), an optical storage medium (a CD-ROM, a DVD, etc.), and a carrier wave that transmits data via the Internet, for example.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reproducing broadcast content, the method comprising:
   receiving, via a first communication channel, packets comprised in a real time broadcast content;
   reproducing the broadcast content in real time;
   receiving, via a second communication channel different from the first communication channel, a duplicate copy of the packets comprised in the real time broadcast content;
   storing the duplicate copy;
   if an error is present in a first packet which is one of the packets comprised in the broadcast content temporarily stopping real time reproduction of the broadcast content; storing the packets received after the stopping of the reproduction; re-obtaining the first packet from the duplicate copy; and
   restarting reproduction of the broadcast content using the re-obtained first packet and the stored packets,
   wherein the re-obtained first packet is an errorless packet.

2. The method of claim 1, wherein the storing the duplicate copy comprises storing the duplicate copy of the packets comprised in the broadcast content, at a server, and
   the re-obtaining the first packet comprises: requesting the server to transmit the first packet from among the stored packets; and re-obtaining the first packet via an external communication network.

3. The method of claim 1, wherein the receiving the duplicate copy of the packets comprises:
   receiving the packets comprised in the broadcast content again after a predetermined period of time.

4. The method of claim 1, further comprising determining whether an error is detected in the first packet, based on header information of the first packet.

5. The method of claim 1, wherein the restarting reproduction comprises:
   replacing the first packet having the error from among the stored packets with the re-obtained first packet; and
   reproducing the broadcast content using the stored packets including the re-obtained first packet.

6. A method of providing broadcast content to a user terminal, the method comprising:
   receiving via a first communication channel and storing, in an external device, a duplicate copy of packets that have been transmitted to the user terminal from a broadcasting system which provides broadcast content in real time via a second communication channel different from the first communication channel; and
   transmitting, from the duplicate copy of the packets stored in the external device, an errorless packet, which corresponds to a packet having an error from among the packets that have been transmitted to the user terminal from the broadcasting system, to the user terminal via an external communication network,
   wherein, when the error is present in the packet, reproduction of the broadcast content is stopped, the packets received after stopping of the reproduction are stored, and the reproduction is restarted by using the transmitted errorless packet and the stored packets.

7. The method of claim 6, wherein the transmitting the errorless packet comprises:
   receiving a request to transmit the errorless packet, from the user terminal; and
   transmitting the errorless packet to the user terminal in response to the request.

8. An apparatus for reproducing broadcast content in real time, the apparatus comprising: a reproducing unit which receives the broadcast content via a first communication channel, and reproduces the broadcast content in real time;
   a device which receives via a second communication channel different from the first communication channel and stores a duplicate copy of packets comprised in the broadcast content being received and reproduced by the reproducing unit;
   a controlling unit which controls a real time reproduction of the broadcast content by the reproducing unit to be temporarily stopped if an error is present in a first packet which is one of the packets comprised in the broadcast content;
   a database in which the packets received after the stopping of the reproduction are stored; and a packet obtaining unit which re-obtains the first packet from the duplicate copy, wherein the reproducing unit resumes reproduction of the broadcast content using the re-obtained first packet and the stored packets, and
   the re-obtained first packet is an errorless packet.

9. The apparatus of claim 8, wherein the device comprises a server and the packet obtaining unit comprises:
   a transmission request unit which requests the server, which stores the duplicate copy of the packets comprised in the broadcast content, to transmit the first packet from among the stored packets; and
   a packet receiving unit which re-obtains the first packet via an external communication network from the server.

10. The apparatus of claim 8, wherein the device comprises: a tuner which receives the duplicate copy of the packets comprised in the broadcast content again after a predetermined period of time.

11. The apparatus of claim 8, further comprising a determination unit which determines whether an error is detected in the first packet, based on header information of the first packet.

12. The apparatus of claim 8, wherein the reproducing unit comprises:
   a replacement unit which replaces the first packet having an error from among the packets stored in the database with the re-obtained first packet; and a content reproducing unit which reproduces the broadcast content using the stored packets including the re-obtained first packet.

13. An apparatus for providing broadcast content to a user terminal, the apparatus comprising:

- a receiving unit which receives, from a broadcasting system via a first communication channel, a duplicate copy of packets that have been transmitted to the user terminal from the broadcasting system which provides broadcast content in real time via a second communication channel different from the first communication channel;
- a database which stores the duplicate copy of the packets received from the broadcasting system via the first communication channel; and
- a transmitting unit which transmits an errorless packet, which has been stored in the duplicate copy of the packets in the database and corresponds to a packet having an error from among the packets that have been transmitted to the user terminal from the broadcasting system, to the user terminal via an external communication network, wherein, when the error is present in the packet, reproduction of the broadcast content is stopped, the packets received after stopping of the reproduction are stored, and the reproduction is restarted by using the transmitted errorless packet and the stored packets.

14. The apparatus of claim 13, wherein the transmitting unit comprises:

- a transmission request receiving unit which receives a request to transmit the errorless packet, from the user terminal; and
- a packet transmitting unit which transmits the errorless packet to the user terminal in response to the request.

15. A non-transitory computer readable medium having recorded thereon a program, which when executed by a computer, causes the computer to execute the method of claim 1.

16. The method of claim 1, wherein the restarting comprises: replacing the packet having the error with the re-obtained first packet; and reproducing the broadcast content using the replaced packet and the stored packets.

17. The method of claim 1, wherein the packets are transmitted to a broadcast apparatus and identical packets are simultaneously transmitted to an external server and stored.

18. The method of claim 17, wherein the re-obtained first packet corresponding to the first packet with the error is stored among the identical packets at the external server.

* * * * *